United States Patent
Li et al.

(10) Patent No.: US 9,974,063 B2
(45) Date of Patent: May 15, 2018

(54) RADIO NETWORK CONTROL METHOD AND RADIO NETWORK CONTROLLER

(71) Applicant: Huawei Technologies Co., Ltd., Shenzhen (CN)

(72) Inventors: You Li, Chengdu (CN); Kun Zeng, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/363,881

(22) Filed: Nov. 29, 2016

(65) Prior Publication Data
US 2017/0086188 A1  Mar. 23, 2017

Related U.S. Application Data

(63) Continuation of application No. PCT/CN2014/079005, filed on May 30, 2014.

(51) Int. Cl.
*G01R 31/08* (2006.01)
*G06F 11/00* (2006.01)
(Continued)

(52) U.S. Cl.
CPC ......... *H04W 72/0413* (2013.01); *H04L 67/16* (2013.01); *H04W 24/08* (2013.01);
(Continued)

(58) Field of Classification Search
CPC ... H04W 15/80; H04W 48/20; H04W 74/008; H04M 15/80
(Continued)

(56) References Cited

U.S. PATENT DOCUMENTS 2,252,105 A   8/1941  Waters
9,155,108 B2 * 10/2015  Norris ............... H04W 74/0866
(Continued)

FOREIGN PATENT DOCUMENTS

CN   1489340 A   4/2004
CN   101198150 A   6/2008
(Continued)

OTHER PUBLICATIONS

Open Flow, "Open Networking Foundation," Version 1.3.4 (Protocol version 0x04), Mar. 27, 2014, 171 pages.
(Continued)

*Primary Examiner* — William D Cumming
(74) *Attorney, Agent, or Firm* — Slater Matsil, LLP

(57) ABSTRACT

A radio network control method and a radio network controller are described. The radio network controller includes: a measurement control unit, adapted to receive radio network information sent by a network node, where the radio network information includes radio channel information and service serving information; a radio network information management unit, adapted to determine, according to the radio network information received by the measurement control unit, a radio network function that needs to be triggered and an algorithm corresponding to the radio network function, and encapsulate radio network information required by the algorithm into a radio network information combination for the algorithm; an algorithm management unit, adapted to determine an execution policy of the algorithm; and a procedure management unit, adapted to generate execution control signaling and send the execution control signaling to the network node.

20 Claims, 8 Drawing Sheets

(51) Int. Cl.
| | |
|---|---|
| *G08C 15/00* | (2006.01) |
| *H04J 3/14* | (2006.01) |
| *H04L 1/00* | (2006.01) |
| *H04L 12/26* | (2006.01) |
| *H04W 72/04* | (2009.01) |
| *H04W 48/20* | (2009.01) |
| *H04L 29/08* | (2006.01) |
| *H04W 24/08* | (2009.01) |
| *H04W 24/10* | (2009.01) |
| *H04W 48/16* | (2009.01) |

(52) U.S. Cl.
CPC ........... *H04W 24/10* (2013.01); *H04W 48/16* (2013.01); *H04W 48/20* (2013.01)

(58) Field of Classification Search
USPC ........................................................ 370/235
See application file for complete search history.

(56) References Cited

U.S. PATENT DOCUMENTS

| | | | |
|---|---|---|---|
| 9,351,193 B2* | 5/2016 | Raleigh | ................ H04M 15/80 |
| 2007/0072609 A1 | 3/2007 | Qiao et al. | |
| 2010/0048214 A1 | 2/2010 | Usuda et al. | |
| 2014/0098671 A1* | 4/2014 | Raleigh | ................ H04M 15/80 370/235 |
| 2015/0257068 A1 | 9/2015 | Fang et al. | |
| 2017/0086188 A1* | 3/2017 | Li | ......................... H04W 48/20 |

FOREIGN PATENT DOCUMENTS

| | | |
|---|---|---|
| CN | 101309442 A | 11/2008 |
| CN | 103229548 A | 7/2013 |
| EP | 1395068 A1 | 3/2004 |
| EP | 1395068 B1 | 6/2010 |
| EP | 2252105 A2 | 11/2010 |
| EP | 2464170 A1 | 6/2012 |

OTHER PUBLICATIONS

Mueller, Christian M., et al. "Signaling Analysis for Multi-Radio Management." Wireless Communications and Networking Conference, 2009. WCNC 2009. IEEE. IEEE, Apr. 2009, 6 pages.

* cited by examiner

RADIO NETWORK CONTROL METHOD AND RADIO NETWORK CONTROLLER

CROSS-REFERENCE TO RELATED APPLICATIONS

This application is a continuation of International Application No. PCT/CN2014/079005, filed on May 30, 2014, the disclosure of which is hereby incorporated by reference in its entirety.

TECHNICAL FIELD

The present invention relates to the field of radio communications technologies, and in particular, to a radio network control method and a radio network controller.

BACKGROUND

With the development of radio communications technologies, a current radio communications network faces a situation in which multiple standards coexist. A 2nd generation (2G) radio communications network runs stably; a 3rd generation (3G) radio communications network improves data service experience of users; a 4th generation (4G) radio communications network is gradually being deployed.

For example, a Global System for Mobile Communications (GSM) network in the 2G network, a Universal Mobile Telecommunications System (UMTS) network in the 3G network, and a Long Term Evolution (LTE) network in the 4G network are all deployed. The GSM network is used for providing basic voice access and wide coverage; the UMTS network is used for providing a high-speed data service; the LTE network is used for providing video calls and hotspot coverage.

However, because there is a difference between architectures of different network standards, and each network standard has an independent control mechanism, in a scenario in which multiple networks are deployed, independent control and management on each network standard consume excessive system resources and adversely affect coordinated management on the multiple networks.

SUMMARY

Embodiments of the present invention provide a radio network control method and a radio network controller, which are used to manage radio networks of multiple standards.

According to a first aspect, a radio network controller is provided, includes a measurement control unit adapted to receive radio network information sent by a network node. The radio network information includes radio channel information and service serving information. A radio network information management unit is adapted to determine, according to the radio network information received by the measurement control unit, a radio network function that needs to be triggered and an algorithm corresponding to the radio network function, and encapsulate radio network information required by the algorithm into a radio network information combination for the algorithm. An algorithm management unit is adapted to determine an execution policy of the algorithm according to the radio network information combination obtained by encapsulation by the radio network information management unit. A procedure management unit is adapted to generate execution control signaling according to the execution policy determined by the algorithm management unit, and send the execution control signaling to the network node, so that the network node completes the radio network function.

In a first possible implementation manner of the first aspect, the measurement control unit is further adapted to receive access request information sent by the network node.

With reference to the first possible implementation manner of the first aspect, in a second possible implementation manner, the radio network information management unit is further adapted to determine a radio network information measurement configuration of the network node according to the access request message received by the measurement control unit, where the radio network information measurement configuration includes an execution entity of measurement, a measurement object, and a report cycle.

With reference to the second possible implementation manner of the first aspect, in a third possible implementation manner, the measurement control unit includes: a radio network information measurement configuration management subunit, adapted to generate measurement signaling procedure invoking information according to the radio network information measurement configuration; a measurement control signaling management subunit, adapted to invoke preset measurement control signaling according to the measurement signaling procedure invoking information generated by the radio network information measurement configuration management subunit; and a measurement control signaling processing and distribution subunit, adapted to send the measurement control signaling invoked by the management subunit to the network node, and receive the radio network information sent by the network node.

With reference to any one of the first aspect to the third possible implementation manner of the first aspect, in a fourth possible implementation manner, the radio network information management unit includes: a radio network information management subunit, adapted to store the radio network information received by the measurement control unit; a radio network function trigger management subunit, adapted to: when at least one piece of radio network information in the radio network information in the radio network information management subunit meets a preset trigger condition, determine, according to a preset radio network function trigger list, the radio network function that needs to be triggered and the algorithm corresponding to the radio network function; and a radio network function requirement management subunit, adapted to encapsulate, according to a preset radio network information list, the radio network information that is determined by the radio network function trigger management subunit and that is required by the algorithm into the radio network information combination for the algorithm.

With reference to any one of the first aspect to the fourth possible implementation manner of the first aspect, in a fifth possible implementation manner, the algorithm management unit includes: an algorithm management subunit, adapted to select a corresponding algorithm according to the radio network information combination obtained by encapsulation by the radio network information management unit, and generate an operation result of the algorithm, where the operation result includes an execution procedure and a configuration parameter that are of the network node; and an algorithm procedure management subunit, adapted to determine the execution policy of the algorithm according to the operation result of the algorithm generated by the algorithm management subunit.

With reference to any one of the first aspect to the fifth possible implementation manner of the first aspect, in a sixth possible implementation manner, the procedure management unit includes: an execution control signaling management subunit, adapted to generate execution control signaling procedure invoking information according to the execution policy determined by the algorithm management unit; a control signaling management subunit, adapted to invoke preset execution control signaling according to the control signaling procedure invoking information generated by the execution control signaling management subunit; and an execution control signaling processing and distribution subunit, adapted to send, to the network node, the execution control signaling invoked by the control signaling management subunit.

With reference to any one of the first aspect to the sixth possible implementation manner of the first aspect, in a seventh possible implementation manner, the radio network controller further includes: a radio network function configuration unit, adapted to: when a new radio network function needs to be configured, configure a radio network information combination required by an algorithm corresponding to each radio network function, configure a trigger condition of each radio network function, configure an execution policy of each algorithm, and configure execution control signaling corresponding to each execution policy.

According to a second aspect, a radio network control method includes receiving radio network information sent by a network node. The radio network information includes radio channel information and service serving information. The method further includes determining, according to the radio network information, a radio network function that needs to be triggered and an algorithm corresponding to the radio network function; encapsulating radio network information required by the algorithm into a radio network information combination for the algorithm; determining an execution policy of the algorithm according to the radio network information combination for the algorithm; generating execution control signaling according to the execution policy; and sending the execution control signaling to the network node, so that the network node completes the radio network function.

In a first possible implementation manner of the second aspect, before the receiving radio network information sent by a network node, where the radio network information includes radio channel information and service serving information, the method further includes: receiving access request information sent by the network node.

With reference to the first possible implementation manner of the second aspect, in a second possible implementation manner, after the receiving access request information sent by the network node, the method further includes: determining a radio network information measurement configuration of the network node according to the access request message, where the radio network information measurement configuration includes an execution entity of measurement, a measurement object, and a report cycle.

With reference to the second possible implementation manner of the second aspect, in a third possible implementation manner, after the receiving access request information sent by the network node, the method further includes: generating measurement signaling procedure invoking information according to the radio network information measurement configuration; invoking preset measurement control signaling according to the measurement signaling procedure invoking information; and sending the measurement control signaling to the network node.

With reference to any one of the second aspect to the third possible implementation manner of the second aspect, in a fourth possible implementation manner, before the determining, according to the radio network information, a radio network function that needs to be triggered and an algorithm corresponding to the radio network function, the method further includes: storing the radio network information. Determining the radio network function includes: when at least one piece of radio network information of the stored radio network information meets a trigger condition, determining, according to a preset radio network function trigger list, the radio network function that needs to be triggered and the algorithm corresponding to the radio network function. The encapsulating radio network information required by the algorithm into a radio network information combination for the algorithm includes: encapsulating, according to a preset radio network information list, the radio network information required by the algorithm that needs to be triggered into the radio network information combination for the algorithm.

With reference to any one of the second aspect to the fourth possible implementation manner of the second aspect, in a fifth possible implementation manner, the determining an execution policy of the algorithm according to the radio network information combination for the algorithm includes: selecting a corresponding algorithm according to the radio network information combination, and generating an operation result of the algorithm, where the operation result includes an execution procedure and a configuration parameter that are of the network node; and determining the execution policy of the algorithm according to the operation result of the algorithm.

With reference to any one of the second aspect to the fifth possible implementation manner of the second aspect, in a sixth possible implementation manner, the generating execution control signaling according to the execution policy includes: generating execution control signaling procedure invoking information according to the execution policy; and invoking preset execution control signaling according to the control signaling procedure invoking information.

With reference to any one of the second aspect to the sixth possible implementation manner of the second aspect, in a seventh possible implementation manner, the method further includes: when a new radio network function needs to be configured, configuring a radio network information combination required by an algorithm corresponding to each radio network function, configuring a trigger condition of each radio network function, configuring an execution policy of each algorithm, and configuring execution control signaling corresponding to each execution policy.

According to the radio network control method and the radio network controller provided in the embodiments of the present invention, a radio network controller is added to a network. The radio network controller determines, by receiving radio network information sent by a network node in the network, a radio network function that needs to be triggered, and controls each network node to complete the radio network function. Because centralized radio network control is used, the radio network controller can simultaneously control radio networks of multiple standards, thereby implementing centralized management on multiple networks, and saving system resources.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
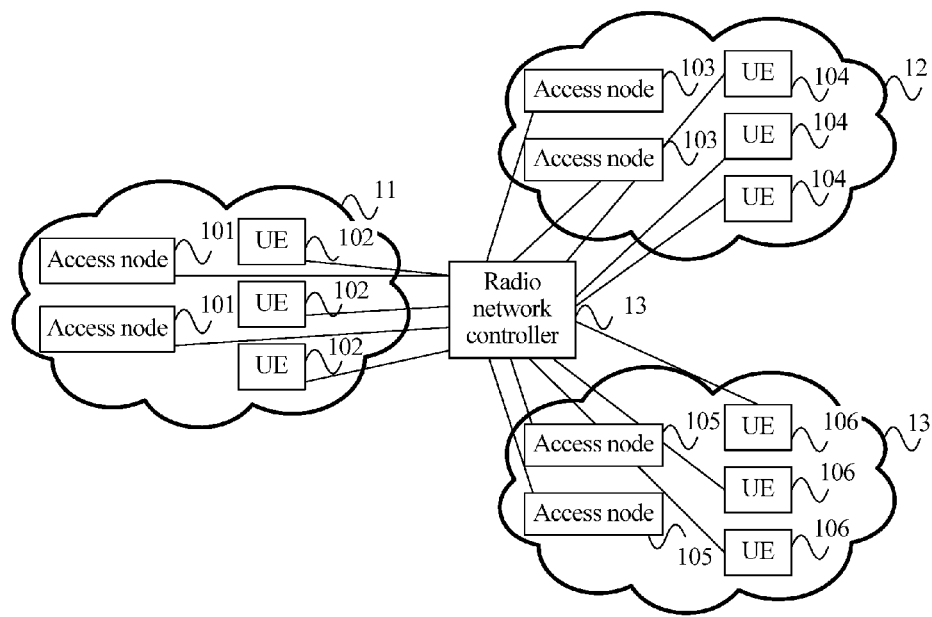
FIG. 1 is a schematic architectural diagram of a radio network system.

FIG. 1 is a schematic architectural diagram of a radio network system. As shown in FIG. 1, the radio network includes networks of three network standards: a GSM network 11, a UMTS network 12, and an LTE network 13. The GSM network includes one or more access nodes 101 and one or more user equipments (user equipment, UE) 102, the UMTS network 12 includes one or more access nodes 103 and one or more UEs 104, and the LTE network 13 includes one or more access nodes 105 and one or more UEs 106. The access nodes 101, the access nodes 103, and the access nodes 105 may be access nodes of any form, such as an evolved Node B (eNB), a macro base station, and a micro base station. The UEs 102 are separately connected to any access node 101; the UEs 104 are separately connected to any access node 103; the UEs 106 are separately connected to any access node 105.

A radio network controller 14 provided in this embodiment is set in a network, and can be connected, by any connection manner, to and communicate with all of the access nodes 101, the access nodes 103, the access nodes 105, the UEs 102, the UEs 104, and the UEs 106 in the network. All of the access nodes 101, the access nodes 103, the access nodes 105, the UEs 102, the UEs 104, and the UEs 106 in the network can be collectively referred to as all network nodes in the network. The radio network controller 14 provided in this embodiment of the present invention may be adapted to manage and control all the network nodes in the network, so as to resolve a problem caused due to that different network standards need to be separately controlled in a network control method in the prior art.

Specifically, the radio network controller 14 manages and controls networks in the following several steps: receiving radio network information sent by a network node; determining, according to the radio network information, whether a radio network function needs to be triggered; performing operation processing on the radio network function that needs to be triggered; and controlling, according to a processing result, the network node to perform corresponding processing. The following describes a structure and a function of a radio network controller in detail with reference to specific embodiments.

Figure 2:
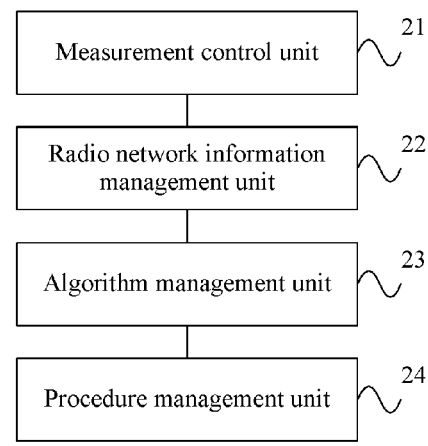
FIG. 2 is a schematic structural diagram of a radio network controller according to an embodiment of the present invention.

FIG. 2 is a schematic structural diagram of a radio network controller according to an embodiment of the present invention. As shown in FIG. 2, the radio network controller in this embodiment includes a measurement control unit 21, a radio network information management unit 22, an algorithm management unit 23, and a procedure management unit 24.

The measurement control unit 21 is adapted to receive radio network information sent by a network node, where the radio network information includes radio channel information and service serving information.

Specifically, the radio network controller provided in this embodiment may be adapted to control network nodes in different network standards in a network, where the network node includes but is not limited to a UE and an access node that are in the network, where the access node may include a node, which has an access function, of any form, such as an eNB, a macro base station, and a micro base station. The radio network controller may receive, by using a wired or wireless connection of any form, information sent by all network nodes in the network.

The network node in the network may measure the radio channel information and the service serving information, where the radio channel information indicates related information obtained by measuring, by the network node, a radio channel on which the network node is located, and the service serving information indicates related information obtained by measuring, by the network node, a service that the network node is operating. In this embodiment of the present invention, the radio channel information and the service serving information are collectively referred to as the radio network information. The radio network information may include signal strength of a serving cell, a quantity of neighboring cells, and signal strength of each neighboring cell that are sent by the UE, load of the serving cell and load of a neighboring cell that are sent by the access node, and the like.

The radio network information management unit 22 is adapted to determine, according to the radio network information received by the measurement control unit 21, a radio network function that needs to be triggered and an algorithm corresponding to the radio network function, and encapsulate radio network information required by the algorithm into a radio network information combination for the algorithm.

Specifically, the radio network information management unit 22 stores a radio network information list required for performing, by each network node, an algorithm corresponding to each radio network function, and a trigger condition of each radio network function. After the measurement control unit 21 receives the radio network information sent by the network node, the radio network information management unit 22 determines whether there is a radio network function meeting a trigger condition; if there is a radio network function meeting the trigger condition, determines an algorithm corresponding to a radio network function that needs to be triggered; and encapsulates radio network information required by the algorithm that corresponds to the radio network function meeting the trigger condition into a radio network information combination for the algorithm.

The radio network function herein includes various processing that the network node performs in a radio network, for example, a UE handover, load balancing performed on access nodes, and access of a UE. The algorithm corresponding to the radio network function indicates a specific method for processing the radio network function. A specific processing procedure that needs to be performed for completing, by the network node, the radio network function is obtained after processing is performed by using the algorithm corresponding to the radio network function. One radio network function may include multiple algorithms, and one algorithm may correspond to multiple radio network functions. For example, a radio network function is used to perform load balancing on access nodes, and an algorithm corresponding to the radio network function may include handovers of multiple UEs.

The algorithm management unit 23 is adapted to determine an execution policy of the algorithm according to the radio network information combination obtained by encapsulation by the radio network information management unit 22.

Specifically, the radio network information management unit 22 sends the encapsulated radio network information combination to the algorithm management unit 23, and the algorithm management unit 23 performs an operation according to the radio network information combination, where an obtained operation result is a processing procedure that needs to be performed by each network node for implementing the radio network function corresponding to the algorithm. In addition, the algorithm management unit 23 further determines an execution sequence of a processing procedure of each network node. The foregoing processing procedure and the execution sequence of the processing procedure are collectively referred to as the execution policy of the algorithm.

The procedure management unit 24 is adapted to generate execution control signaling according to the execution policy determined by the algorithm management unit 23, and send the execution control signaling to the network node, so that the network node completes the radio network function.

Specifically, because management and control on a network node need to be performed in a signaling manner, the radio network controller further includes the procedure management unit 24. The procedure management unit 24 stores execution control signaling required for implementing an operation result of each algorithm, and the procedure management unit 24 generates the corresponding execution control signaling according to the execution policy determined by the algorithm management unit 23, and successively sends the execution control signaling to each network node according to the processing procedure determined by the algorithm management unit 23. Each network node may perform corresponding processing according to an instruction of the execution control signaling, so as to complete the radio network function that is determined by the radio network information management unit 22 and that needs to be triggered.

In this embodiment, a radio network controller is added to a network. The radio network controller determines, by receiving radio network information sent by a network node in the network, a radio network function that needs to be triggered, and controls each network node to complete the radio network function. Because centralized radio network control is used, the radio network controller can simultaneously control radio networks of multiple standards, thereby implementing centralized management on multiple networks, and saving system resources.

In the embodiment shown in FIG. 2, the measurement control unit 21 is adapted to receive the radio network information sent by the network node. However, the network node in the network has two working states. A first state is that, the network node already accesses the network; when sending the radio network information to the measurement control unit 21, the network node sends the radio network information according to an instruction made by the measurement control unit 21 during the access. A second state is that, the network node newly accesses the network; in this case, the measurement control unit 21 first receives an access request message sent by the network node; after receiving the access request message, the measurement control unit 21 controls the network node to measure the radio network information and report a measurement result.

Optionally, a radio network information measurement configuration may be preset in the measurement control unit 21, where the radio network information measurement configuration includes an execution entity of measurement, a measurement object, and a report cycle, that is, the radio network information measurement configuration includes the following information: "who measures", "what to measure", and "how to report". After receiving the access request message sent by the network node, the measurement control unit 21 queries the preset radio network information measurement configuration, learns that the network node newly accesses the network, and determines, according to related information of the network node in the access request message, a rule in which the network node measures and reports the radio network information. Then the measurement control unit 21 may generate corresponding measurement control signaling, and send the measurement control signaling to the network node, so as to control the network node to measure the radio network information and report a measurement result.

Optionally, the measurement control unit 21 may not store a radio network information measurement configuration, and instead, notifies the radio network information management unit 22 of the access request message after receiving the access request message. A list of accessed network nodes and a radio network information measurement configuration are stored in the radio network information management unit 22; the radio network information management unit 22 determines the radio network information measurement configuration of the network node according to the access request message sent by the measurement control unit 21, and sends the radio network information measurement configuration to the measurement control unit 21. The measurement control unit 21 generates corresponding measurement control signaling according to the radio network information measurement configuration determined by the radio network information management unit 22, and sends the measurement control signaling to the network node, so as to control the network node to measure the radio network information and report a measurement result.

Alternatively, there is another implementation manner. A radio network information measurement configuration is stored in the measurement control unit 21; however, the radio network information measurement configuration does not include a list of accessed network nodes. The measurement control unit 21 still needs to send the access request message to the radio network information management unit 22 after receiving the access request message. The radio network information management unit 22 includes the list of accessed network nodes. When determining that the network node that sends the access request message is a newly accessed network node, the radio network information management unit 22 notifies the measurement control unit 21. The measurement control unit 21 generates corresponding measurement control signaling according to the stored radio network information measurement configuration, and sends the measurement control signaling to the network node, so as to control the network node to measure the radio network information and report a measurement result.

Figure 3:
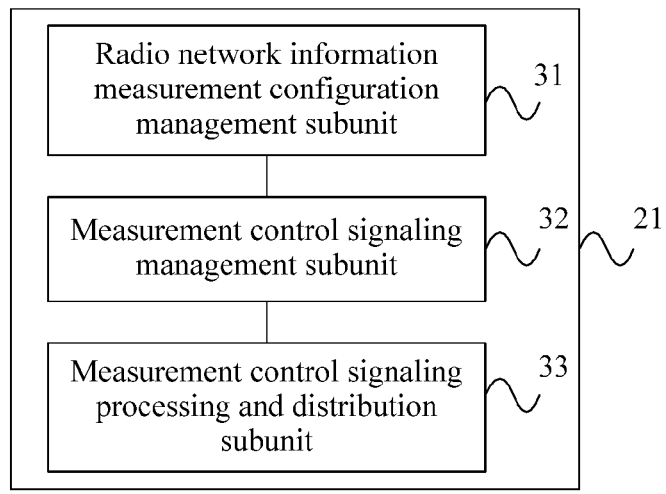
FIG. 3 is a schematic structural diagram of a measurement control unit in a radio network controller according to an embodiment of the present invention.

FIG. 3 is a schematic structural diagram of a measurement control unit in a radio network controller according to an embodiment of the present invention. As shown in FIG. 3, the measurement control unit 21 in this embodiment includes a radio network information measurement configuration management subunit 31, a measurement control signaling management subunit 32, and a measurement control signaling processing and distribution subunit 33.

The radio network information measurement configuration management subunit 31 is adapted to generate measurement signaling procedure invoking information according to a radio network information measurement configuration.

Specifically, the radio network information measurement configuration management subunit 31 stores the radio network information measurement configuration. After the measurement control unit 21 receives an access request message, the radio network information measurement configuration management subunit 31 generates, according to the radio network information measurement configuration, signaling invoking information required for measuring each piece of radio network information.

The measurement control signaling management subunit 32 is adapted to invoke preset measurement control signaling according to the measurement signaling procedure invoking information generated by the radio network information measurement configuration management subunit 31.

Specifically, the radio network controller controls a network node in a signaling manner, and the measurement control signaling management subunit 32 stores signaling for invoking each network node to perform measurement. The measurement control signaling management subunit 32 successively invokes each piece of preset measurement control signaling according to a measurement signaling procedure generated by the radio network information measurement configuration management subunit 31.

The measurement control signaling processing and distribution subunit 33 is adapted to send the measurement control signaling invoked by the measurement control signaling management subunit 32 to the network node, and receive radio network information sent by the network node.

Specifically, the measurement control signaling processing and distribution subunit 33 successively sends each piece of measurement control signaling invoked by the measurement control signaling management subunit 32 to a corresponding network node, so that the network node measures the radio network information. In addition, the measurement control signaling processing and distribution subunit 33 is further adapted to receive radio network information sent by each network node.

Figure 4:
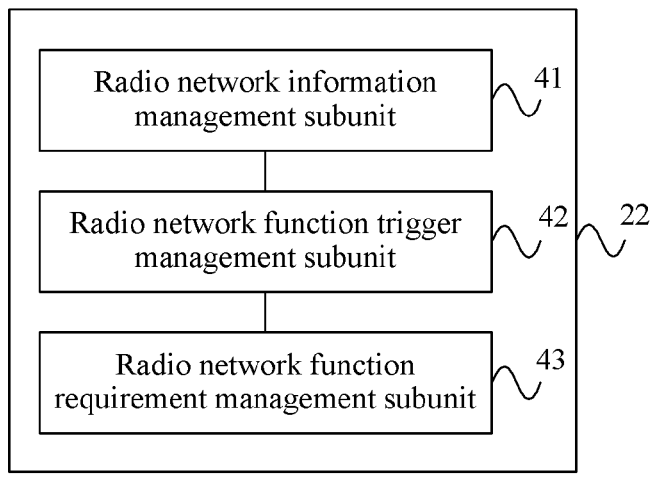
FIG. 4 is a schematic structural diagram of a radio network information management unit in a radio network controller according to an embodiment of the present invention.

FIG. 4 is a schematic structural diagram of a radio network information management unit in a radio network controller according to an embodiment of the present invention. As shown in FIG. 4, the radio network information management unit 22 in this embodiment includes a radio network information management subunit 41, a radio network function trigger management subunit 42, and a radio network function requirement management subunit 43.

The radio network information management subunit 41 is adapted to store radio network information received by a measurement control unit 21.

Specifically, the radio network information management subunit 41 is disposed in the radio network information management unit 22, where the radio network information management subunit 41 is adapted to store the radio network information received by the measurement control unit 21. All radio network information received by the measurement control unit 21 is stored in the radio network information management subunit 41. When the radio network information received by the measurement control unit 21 is already stored in the radio network information management subunit 41, the radio network information management subunit 41 updates the stored radio network information.

The radio network information management subunit 41 is disposed in the radio network information management unit 22 because report cycles of the radio network information sent by a network node to the measurement control unit 21 may be different, and the measurement control unit 21 does not receive all radio network information from the network node at any time. However, after receiving the radio network information, when the radio network information management unit 22 determines to trigger a radio network function, radio network information required by an algorithm corresponding to the radio network function may not be received by the measurement control unit 21. In this case, it is possible that a radio network information combination for the algorithm corresponding to the radio network function that needs to be triggered cannot be generated. Therefore, the radio network information management subunit 41 is disposed in the radio network information management unit 22, and updates information in the radio network information management subunit 41 according to the radio network information received by the measurement control unit 21. In this way, it can be ensured that the information in the radio network information management subunit 41 is complete, and it can be ensured that the corresponding radio network information combination can be generated.

The radio network function trigger management subunit 42 is adapted to: when at least one piece of radio network information in the radio network information stored in the radio network information management subunit 41 meets a preset trigger condition, determine, according to a preset radio network function trigger list, the radio network function that needs to be triggered and the algorithm corresponding to the radio network function.

Specifically, the radio network function trigger management subunit 42 may further be disposed in the radio network information management unit 22, where the radio network function trigger management subunit 42 stores the radio network function trigger list. The radio network function trigger management subunit 42 monitors the radio network information in the radio network information management subunit 41. When the at least one piece of radio network information in the radio network information management subunit 41 meets the preset trigger condition, the radio network function trigger management subunit 42 determines, according to the radio network function trigger list, the radio network function that needs to be triggered.

Further, the radio network function trigger management subunit 42 further includes an algorithm list corresponding to each radio network function. After the radio network function that needs to be triggered is determined, the radio network function trigger management subunit 42 may further determine the algorithm corresponding to the radio network function.

The radio network function requirement management subunit 43 is adapted to encapsulate, according to a preset radio network information list, the radio network information that is determined by the radio network function trigger management subunit 42 and that is required by the algorithm into the radio network information combination for the algorithm.

Specifically, the radio network information management unit 22 further includes the radio network function requirement management subunit 43, where the radio network function requirement management subunit 43 stores the radio network information list required by the algorithm corresponding to the radio network function. After the radio network function trigger management subunit 42 determines the radio network function that needs to be triggered and the algorithm corresponding to the radio network function, the radio network function requirement management subunit 43 invokes, from the radio network information management subunit 41, the radio network information that is required by the algorithm that needs to be triggered, and encapsulates the radio network information into the radio network information combination for the algorithm.

Figure 5:
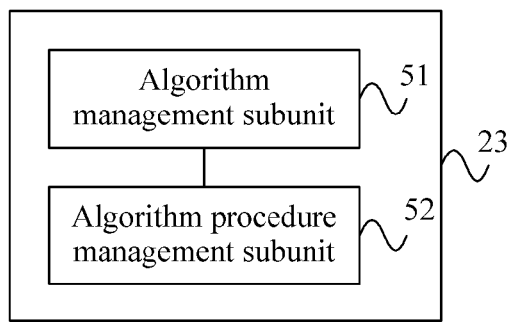
FIG. 5 is a schematic structural diagram of an algorithm management unit in a radio network controller according to an embodiment of the present invention.

FIG. 5 is a schematic structural diagram of an algorithm management unit in a radio network controller according to an embodiment of the present invention. As shown in FIG. 5, the algorithm management unit 23 in this embodiment includes an algorithm management subunit 51 and an algorithm procedure management subunit 52.

The algorithm management subunit 51 is adapted to: select a corresponding algorithm according to a radio network information combination obtained by encapsulation by a radio network information management unit 22, to perform operation; and generate an operation result of the algorithm, where the operation result includes an execution procedure and a configuration parameter that are of the network node participating in execution of the algorithm.

Specifically, the algorithm management subunit 51 stores a specific operation method and a procedure of each algorithm. After receiving the radio network information combination obtained by encapsulation by the radio network information management unit 22, the algorithm management subunit 51 selects the algorithm corresponding to the radio network information combination to perform the operation, and generates the operation result. The operation result of the algorithm includes the execution procedure and the configuration parameter that are of the network node that participates in the execution of the algorithm, that is, the operation result of the algorithm includes a specific processing method required for controlling the network node to complete a radio network function corresponding to the algorithm.

The algorithm procedure management subunit 52 is adapted to determine an execution policy of the algorithm according to the operation result of the algorithm generated by the algorithm management subunit 51.

Specifically, because completing a radio network function may require processing performed by multiple network nodes, the algorithm management unit 23 may further include the algorithm procedure management subunit 52. After obtaining the operation result generated by the algorithm management subunit 51, the algorithm procedure management subunit 52 coordinates execution entities that execute the operation result of the algorithm, and finally determines the execution policy of the algorithm.

Figure 6:
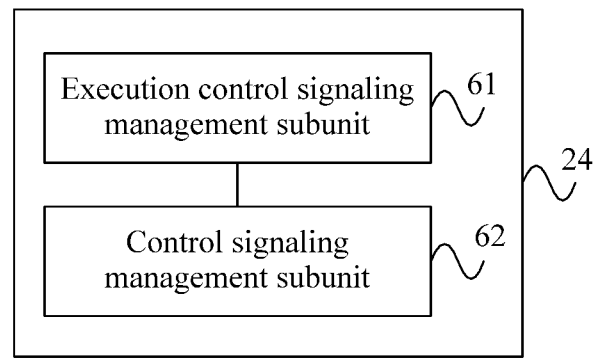
FIG. 6 is a schematic structural diagram of a procedure management unit in a radio network controller according to an embodiment of the present invention.

FIG. 6 is a schematic structural diagram of a procedure management unit in a radio network controller according to an embodiment of the present invention. As shown in FIG. 6, the procedure management unit 24 in this embodiment includes an execution control signaling management subunit 61, a control signaling management subunit 62, and an execution control signaling processing and distribution subunit 63.

The execution control signaling management subunit 61 is adapted to generate execution control signaling procedure invoking information according to an execution policy determined by an algorithm management unit 23.

Specifically, after acquiring the execution policy determined by the algorithm management unit 23, the execution control signaling management subunit 61 determines, according to the execution policy, a sequence of control signaling that needs to be invoked, and generates the execution control signaling procedure invoking information.

The control signaling management subunit 62 is adapted to invoke preset execution control signaling according to the control signaling procedure invoking information generated by the execution control signaling management subunit 61.

Specifically, because the radio network controller controls a network node in a signaling manner, the control signaling management subunit 62 stores control signaling for invoking each network node to complete each processing procedure. The control signaling management subunit 62 successively invokes each piece of preset control signaling according to the control signaling procedure invoking information generated by the execution control signaling management subunit 61.

The execution control signaling processing and distribution subunit 63 is adapted to send the execution control signaling invoked by the control signaling management subunit 62 to the network node, so as to control the network node to complete a radio network function corresponding to an algorithm.

Specifically, the execution control signaling processing and distribution subunit 63 successively sends each piece of control signaling invoked by the measurement control signaling management subunit 62 to a corresponding network node, so that the network node completes each processing procedure, and finally completes a radio network function determined by a radio network information management unit 22.

Figure 7:
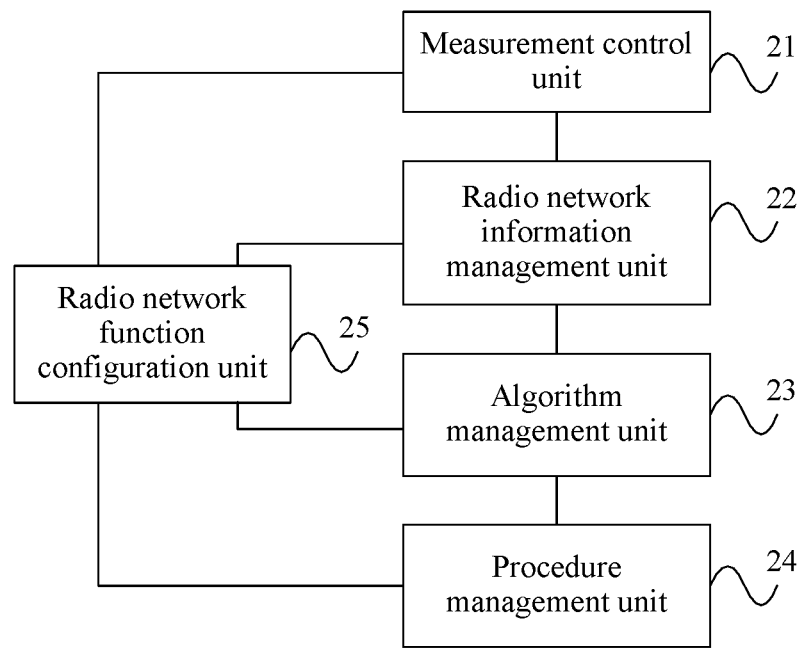
FIG. 7 is a schematic structural diagram of another embodiment of a radio network controller according to an embodiment of the present invention.

FIG. 7 is a schematic structural diagram of another embodiment of a radio network controller according to an embodiment of the present invention. As shown in FIG. 7, based on FIG. 2, the radio network controller in this embodiment further includes: a radio network function configuration unit 25, adapted to: when a new radio network function needs to be configured, configure a radio network information combination required by an algorithm corresponding to each radio network function, configure a trigger condition of each radio network function, configure an execution policy of each algorithm, and configure execution control signaling corresponding to each execution policy.

Specifically, it can be learned from the embodiment shown in FIG. 2 that the radio network controller provided in the embodiment of the present invention involves four steps: information collection, statistical analysis, algorithm processing, and invoking a network node according to a specific execution procedure. Accordingly, the foregoing four steps respectively correspond to four units: a measurement control unit 21, a radio network information management unit 22, an algorithm management unit 23, and a procedure management unit 24. The foregoing four units may complete control on a radio network according to a preset configuration.

However, for an unknown network node that newly accesses a network, or for a newly defined network standard, or for a newly defined radio network function, a mechanism further needs to be set to configure the radio network controller. The radio network function configuration module 25 may invoke an interface of the measurement control unit 21, to configure a radio network information measurement configuration, required by each algorithm, in the measurement control unit 21, that is, define parameters such as an execution entity, a measurement object, and a report cycle that are required by each algorithm.

The radio network function configuration module 25 invokes an interface of the radio network information management unit 22, to configure radio network information required by an algorithm corresponding to each radio network function, and configure a trigger condition of each radio network function. When a new radio network function needs to be added to the network, the radio network function configuration module 25 may configure the trigger condition of each radio network function and the required radio network information.

The radio network function configuration module 25 invokes an interface of the algorithm management unit 23, to write a calculation method and formula of the algorithm into the algorithm management unit 23.

The radio network function configuration module 25 invokes an interface of the procedure management unit 24, to write specific execution steps of the algorithm and a method for controlling execution of a network node.

The radio network function configuration unit 25 is disposed in the radio network controller, so that the radio network controller can be applied to any radio communications network. When a new radio communications standard device is added to a radio communications network, or a new radio network function needs to be added to a network, the radio network controller does not need to be replaced. Instead, a new configuration can be added to another unit of the radio network controller by using the radio network function configuration unit 25, so that an investment in a new control system can be economized when the network is updated.

Figure 8:
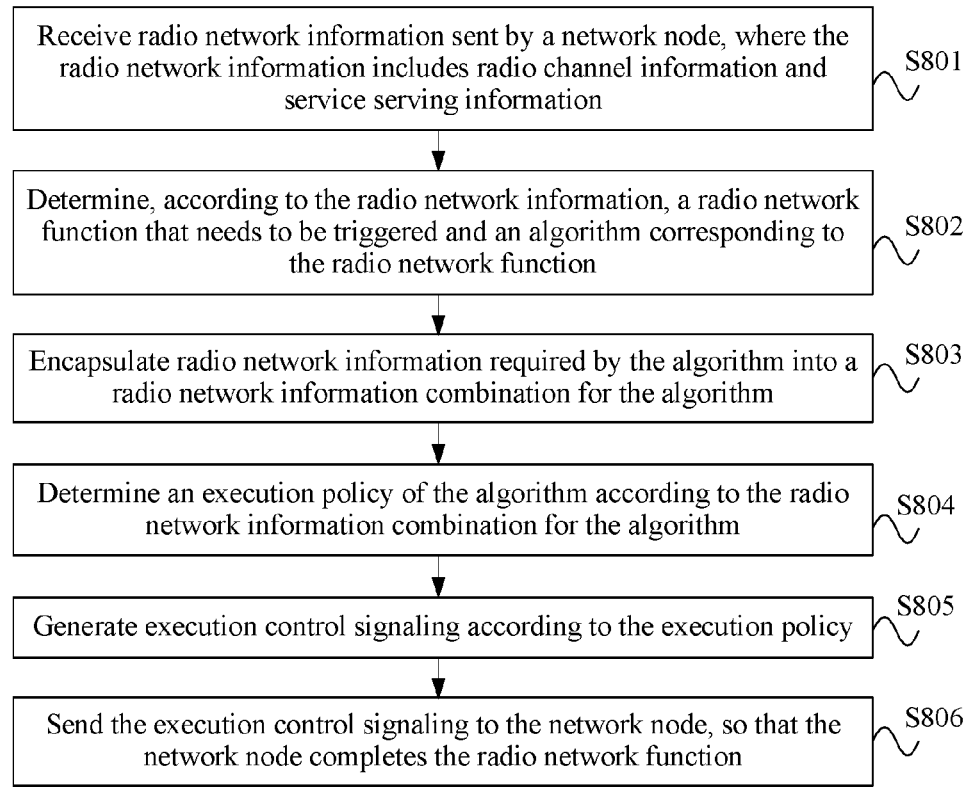
FIG. 8 is a flowchart of Embodiment 1 of a radio network control method according to an embodiment of the present invention.

FIG. 8 is a flowchart of Embodiment 1 of a radio network control method according to an embodiment of the present invention. As shown in FIG. 8, the method in this embodiment includes:

Step S801. Receive radio network information sent by a network node, where the radio network information includes radio channel information and service serving information.

Step S802. Determine, according to the radio network information, a radio network function that needs to be triggered and an algorithm corresponding to the radio network function.

Step S803. Encapsulate radio network information required by the algorithm into a radio network information combination for the algorithm.

Step S804. Determine an execution policy of the algorithm according to the radio network information combination for the algorithm.

Step S805. Generate execution control signaling according to the execution policy.

Step S806. Send the execution control signaling to the network node, so that the network node completes the radio network function.

The radio network control method in this embodiment is used to complete processing of the radio network controller shown in FIG. 2, and implementation principles and technical effects thereof are similar and not described herein.

Further, before step S801 of the embodiment shown in FIG. 8, the method further includes: receiving access request information sent by the network node.

Optionally, controlling the network node to measure the radio network information includes: controlling, according to a radio network information measurement configuration, the network node to measure the radio network information, where the radio network information measurement configuration includes an execution entity of measurement, a measurement object, and a report cycle.

Further, after step S802 of the embodiment shown in FIG. 8, the method further includes: determining the radio network information measurement configuration of the network node according to the access request message.

Figure 9:
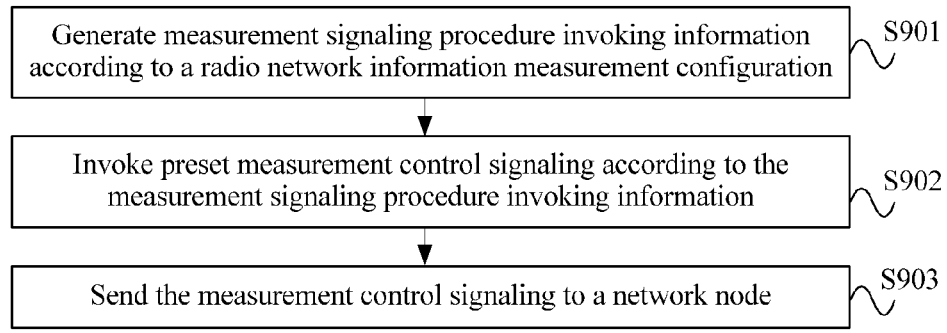
FIG. 9 is a flowchart of Embodiment 2 of a radio network control method according to an embodiment of the present invention.

FIG. 9 is a flowchart of Embodiment 2 of a radio network control method according to an embodiment of the present invention. As shown in FIG. 9, the method in this embodiment includes the following.

Step S901. Generate measurement signaling procedure invoking information according to the radio network information measurement configuration.

Step S902. Invoke preset measurement control signaling according to the measurement signaling procedure invoking information.

Step S903. Send the measurement control signaling to the network node.

The radio network control method in this embodiment is used to complete processing of the measurement control unit in the radio network controller shown in FIG. 3, and implementation principles and technical effects thereof are similar and not described herein.

Figure 10:
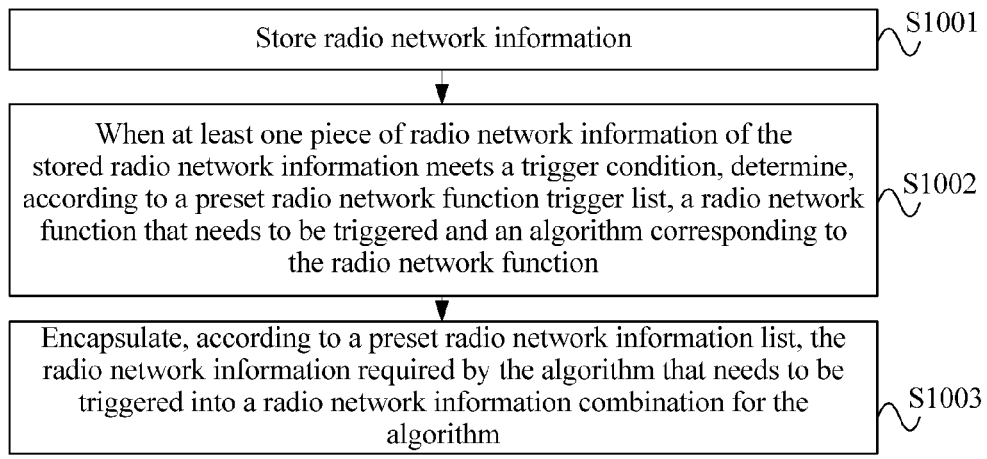
FIG. 10 is a flowchart of Embodiment 3 of a radio network control method according to an embodiment of the present invention.

FIG. 10 is a flowchart of Embodiment 3 of a radio network control method provided in an embodiment of the present invention. As shown in FIG. 10, the method in this embodiment includes the following.

Step S1001. Store the radio network information.

Step S1002. When at least one piece of radio network information of the stored radio network information meets a trigger condition, determine, according to a preset radio network function trigger list, the radio network function that needs to be triggered and the algorithm corresponding to the radio network function.

Step S1003. Encapsulate, according to a preset radio network information list, the radio network information required by the algorithm that needs to be triggered into the radio network information combination for the algorithm.

The radio network control method in this embodiment is used to complete processing of the radio network information management unit in the radio network controller shown in FIG. 4, and implementation principles and technical effects thereof are similar and not described herein.

Figure 11:
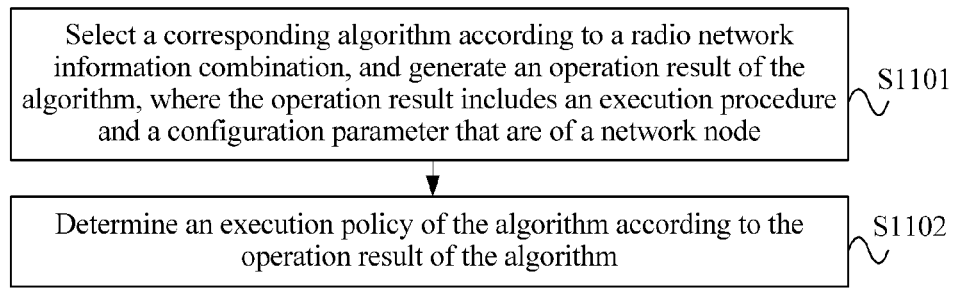
FIG. 11 is a flowchart of Embodiment 4 of a radio network control method according to an embodiment of the present invention.

FIG. 11 is a flowchart of Embodiment 4 of a radio network control method according to an embodiment of the present invention. As shown in FIG. 11, the method in this embodiment includes the following.

Step S1101. Select a corresponding algorithm according to the radio network information combination, and generate an operation result of the algorithm, where the operation result includes an execution procedure and a configuration parameter that are of the network node.

Step S1102. Determine the execution policy of the algorithm according to the operation result of the algorithm.

The radio network control method in this embodiment is used to complete processing of the algorithm management unit in the radio network controller shown in FIG. 5, and implementation principles and technical effects thereof are similar and not described herein.

Figure 12:
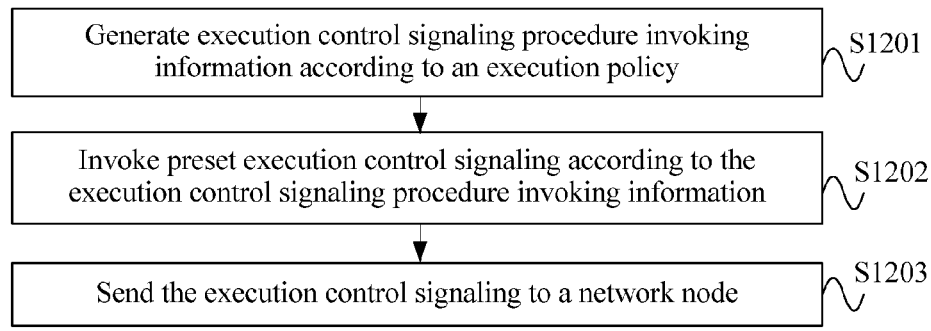
FIG. 12 is a flowchart of Embodiment 5 of a radio network control method according to an embodiment of the present invention.

FIG. 12 is a flowchart of Embodiment 5 of a radio network control method according to an embodiment of the present invention. As shown in FIG. 12, the method in this embodiment includes the following.

Step S1201. Generate execution control signaling procedure invoking information according to the execution policy.

Step S1202. Invoke preset execution control signaling according to the control signaling procedure invoking information.

Step S1203. Send the execution control signaling to the network node.

The radio network control method in this embodiment is used to complete processing of the procedure management unit in the radio network controller shown in FIG. 6, and implementation principles and technical effects thereof are similar and not described herein.

Figure 13:
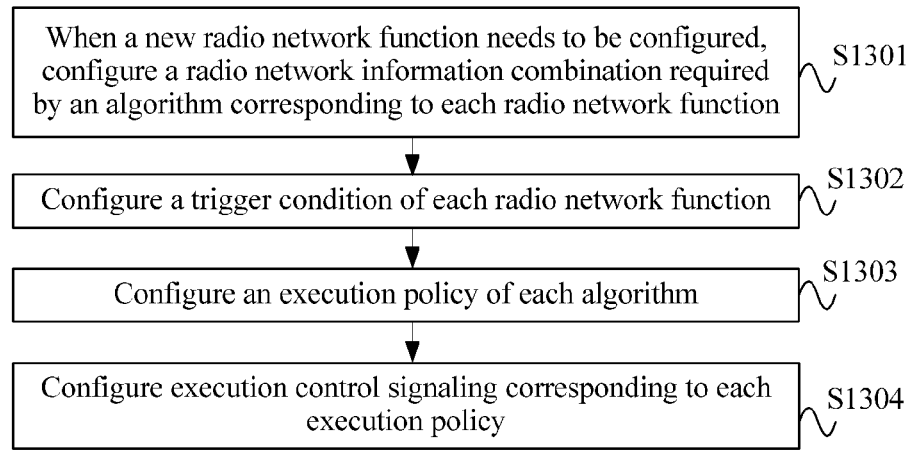
FIG. 13 is a flowchart of Embodiment 6 of a radio network control method according to an embodiment of the present invention.

FIG. 13 is a flowchart of Embodiment 6 of a radio network control method according to an embodiment of the present invention. As shown in FIG. 13, the method in this embodiment includes the following.

Step S1301. When a new radio network function needs to be configured, configure a radio network information combination required by an algorithm corresponding to each radio network function.

Step S1302. Configure a trigger condition of each radio network function.

Step S1303. Configure an execution policy of each algorithm.

Step S1304. Configure execution control signaling corresponding to each execution policy.

The radio network control method in this embodiment is used to complete processing of the radio network function configuration unit in the radio network controller shown in FIG. 7, and implementation principles and technical effects thereof are similar and not described herein.

Figure 14:
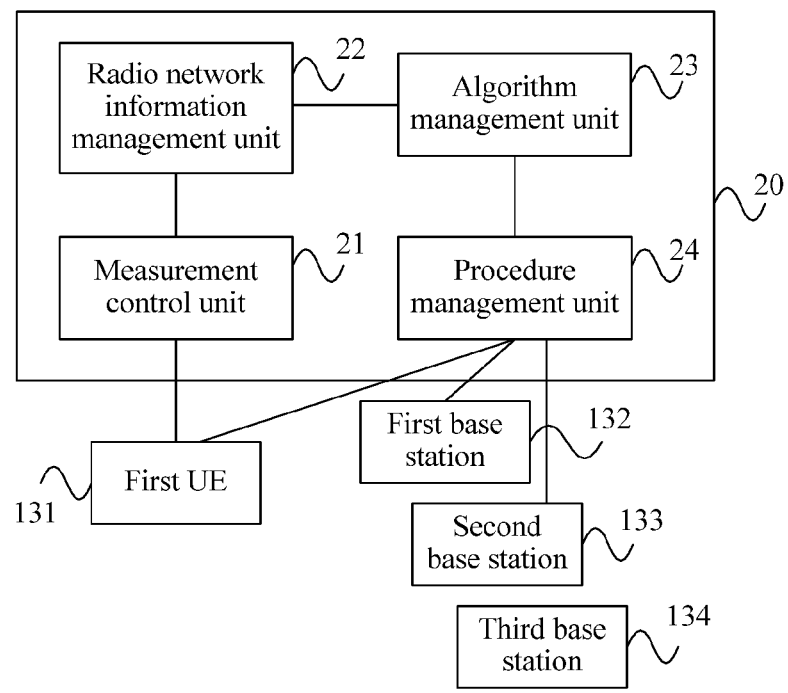
FIG. 14 is a schematic diagram of a specific implementation method for performing a UE handover in a radio network control method according to an embodiment of the present invention.

In the following, the radio network controller provided in the embodiment of the present invention is described in detail in specific embodiments. FIG. 14 is a schematic diagram of a specific implementation method for performing a UE handover in a radio network control method according to an embodiment of the present invention. As shown in FIG. 14, a radio network controller 20 includes a measurement control unit 21, a radio network information management unit 22, an algorithm management unit 23, and a procedure management unit 24. A first UE 131 in a network accesses a first base station 132, and the first UE 131 is located within coverage of both a second base station 133 and a third base station 134. The first UE 131 periodically measures cell signal strength of the first base station 132, the second base station 133, and the third base station 134, and reports to the measurement control unit 21. The measurement control unit 21 sends, to the radio network information management unit 22, the received cell signal strength, reported by the first UE 131, of the first base station 132, the second base station 133, and the third base station 134. The radio network information management unit 22 updates stored radio network information; when finding that the cell signal strength, sent by the first UE 131, of the first base station 132 is lower than a preset threshold, the radio network information management unit 22 identifies that UE handover processing needs to be triggered, and determines that the cell signal strength of the first base station 132, the second base station 133, and the third base station 134 is required for a handover algorithm. The radio network information management unit 22 encapsulates the cell signal strength of the first base station 132, the second base station 133, and the third base station 134 together, and sends encapsulated information to the algorithm management unit 23. The algorithm management unit 23 distributes the encapsulated information to the handover algorithm, and the handover algorithm determines, after performing an operation, that the first UE 131 needs to be handed over from the first base station 132 to the second base station 133, and sends an operation result to the procedure management unit 24. The procedure management unit 24 invokes a processing procedure and control signaling that are required for handing over the first UE 131 from the first base station 132 to the second base station 133, and successively controls the first UE 131, the first base station 132, and the second base station 133 to complete handover processing.

Figure 15:
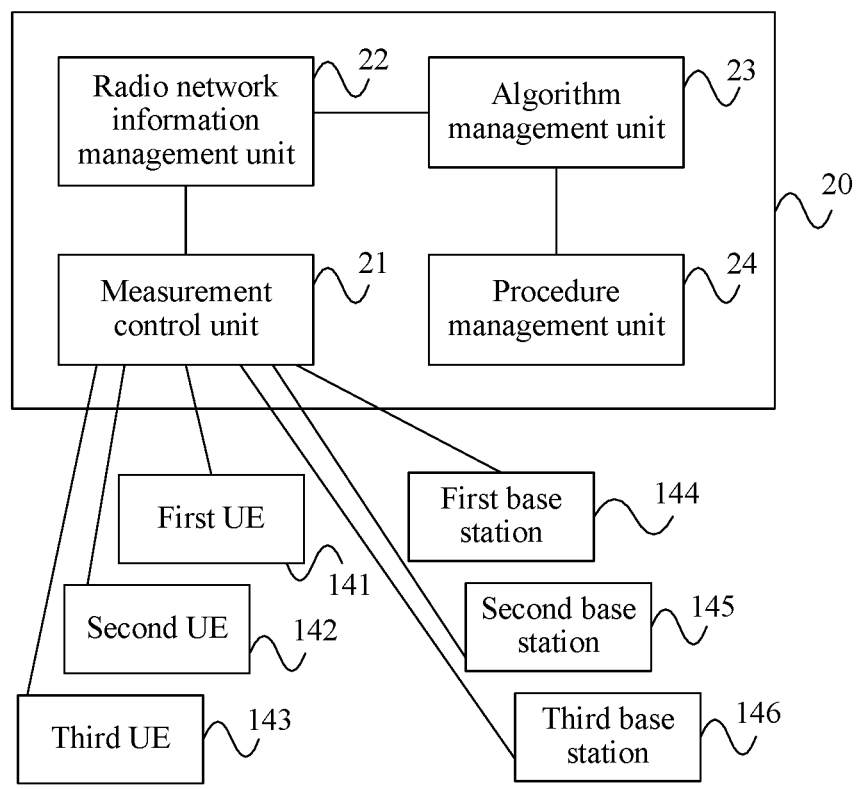
FIG. 15 and FIG. 16 are schematic diagrams of a specific implementation method for performing load balancing in a radio network control method according to an embodiment of the present invention.
Figure 16:
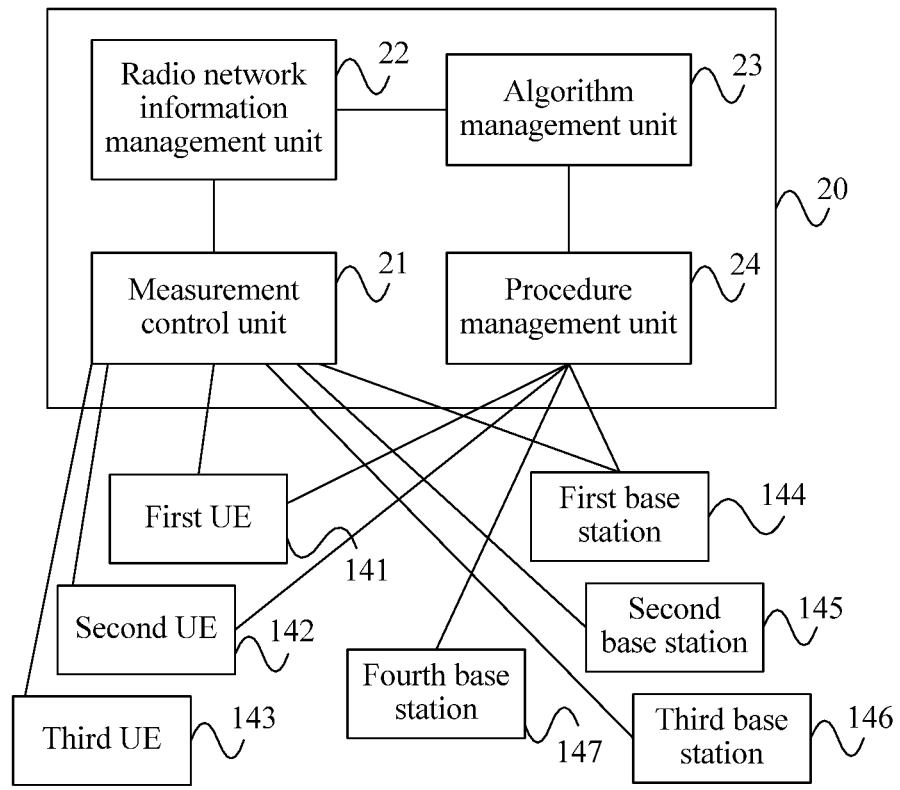

FIG. 15 and FIG. 16 are schematic diagrams of a specific implementation method for performing load balancing in a radio network control method according to an embodiment of the present invention. As shown in FIG. 15, a radio network controller 20 includes a measurement control unit 21, a radio network information management unit 22, an algorithm management unit 23, and a procedure management unit 24. A first UE 141, a second UE 142, and a third UE 143 in a network are connected to a first base station 144, and all of the first UE 141, the second UE 142, and the third UE 143 are located within coverage of both a second base station 145 and a third base station 146. In the $n^{th}$ round of load balancing processing, the first UE 141, the second UE 142, and the third UE 143 periodically measure cell signal strength of the first base station 144, the second base station 145, and the third base station 146 respectively, and separately report to the measurement control unit 21. The measurement control unit 21 further receives cell load reported by the first base station 144, the second base station 145, and the third base station 146. The measurement control unit 21 sends the foregoing information to the radio network information management unit 22. The radio network information management unit 22 updates stored radio network information, and when finding that load of the first base station 144 is higher than a preset threshold, determines that load balancing needs to be triggered. The radio network information management unit 22 determines that a handover algorithm corresponding to the load balancing requires load of an overloaded cell, load of a neighboring cell, and cell signal strength of a UE that accesses the overloaded cell. Therefore, the radio network information management unit 22 encapsulates the cell load of the first base station 144, the second base station 145, and the third base station 146, and the cell signal strength of the first UE 141, the second UE 142, and the third UE 143 together, and sends encapsulated information to the algorithm management unit 23. The algorithm management unit 23 determines, after performing an operation, that the first UE 141 and the second UE 142 need to be handed over from the first base station 144. However, the second base station 145 and the third base station 146 are in a full-load running state, and a handover cannot be performed.

As shown in FIG. 16, in the $(n+1)^{th}$ round of load balancing processing, the measurement control unit 21 finds that a new fourth base station 147 accesses a network, receives load information sent by the fourth base station 147 and cell signal strength of the fourth base station 147 measured by the first UE 141, the second UE 142, and the third UE 143, and sends the foregoing information to the radio network information management unit 22. The radio network information management unit 22 updates stored radio network information and when finding that the load of the first base station 144 is higher than the preset threshold, determines that load balancing needs to be triggered. The radio network information management unit 22 determines that a handover algorithm corresponding to the load balancing requires load of an overloaded cell, load of a neighboring cell, and cell signal strength of a UE that accesses the overloaded cell. Therefore, the radio network information management unit 22 encapsulates the cell load of the first base station 144, the second base station 145, the third base station 146, and the fourth base station 147, and the cell signal strength of the first UE 141, the second UE 142, and the third UE 143 together, and sends encapsulated information to the algorithm management unit 23. The algorithm management unit 23 determines, after performing an operation, that the first UE 141 and the second UE 142 need to be handed over from the first base station 144 and that the fourth base station 147 is in a light-load state; determines to hand over the first UE 141 and the second UE 142 to the fourth base station 147; and sends an operation result to the procedure management unit 24. The procedure management unit 24 invokes a processing procedure and control signaling that are required for handing over the first UE 141 and the second UE 142 from the first base station 144 to the fourth base station 147, and successively controls the first UE 141, the second UE 142, the first base station 144, and the fourth base station 147 to complete handover processing.

Figure 17:
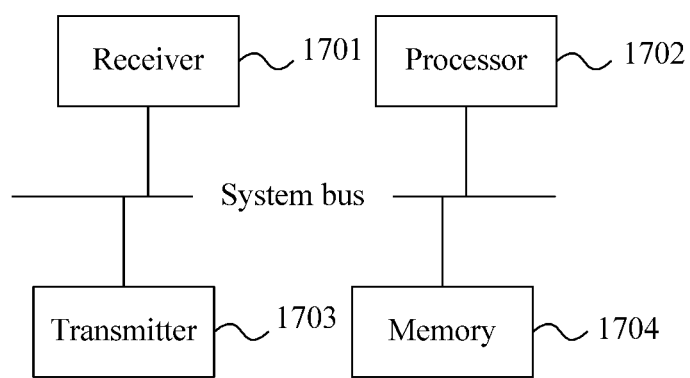
FIG. 17 is a schematic structural diagram of still another embodiment of a radio network controller according to an embodiment of the present invention.

FIG. 17 is a schematic structural diagram of still another embodiment of a radio network controller according to an embodiment of the present invention. As shown in FIG. 17, the radio network controller in this embodiment includes: a receiver 1701, a processor 1702, and a transmitter 1703. Optionally, the media file server may further include a memory 1704. The receiver 1701, the processor 1702, the transmitter 1703, and the memory 1704 may be connected by using a system bus or in another manner, and an example of being connected by using a system bus is used in FIG. 17. The system bus may be an Industrial Standard Architecture (ISA) bus, a Peripheral Component Interconnect (PCI) bus, an Extended Industrial Standard Architecture (EISA) bus, or the like. The system bus may be classified into an address bus, a data bus, a control bus, and the like. To facilitate illustration, only one line is used in FIG. 17 to represent the bus, but it does not indicate that there is only one bus or only one type of bus.

The receiver 1701 is adapted to execute the step described in step S801.

The processor 1702 is adapted to execute the steps described in step S802 to step S805.

The transmitter 1703 is adapted to execute the step described in step S806.

The memory 1704 is adapted to: store information received by the receiver 1701; store data processed by the processor 1702; and send the stored data by using the transmitter 1703.

The media file server in this embodiment is adapted to execute the technical solution of the method embodiment shown in FIG. 8, and implementation principles and technical effects thereof are similar and are not described herein.

Further, the processor 1702 is further adapted to execute the steps described in step S901 and step S902, and the transmitter 1703 is further adapted to execute the step described in step S903.

Further, the memory 1704 is further adapted to execute the step described in step S1001, and the processor 1702 is further adapted to execute the steps described in step S1002 and step S1003.

Further, the processor 1702 is further adapted to execute the steps described in step S1102 and step S1103.

Further, the processor 1702 is further adapted to execute the steps described in step S1201 and step S1202, and the transmitter 1703 is further adapted to execute the step described in step S1203.

Further, the processor 1702 is further adapted to execute the steps described in step S1302 and step S1303.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A radio network controller comprising:
a processor; and
a non-transitory computer readable medium connected to the processor and storing a program for execution by the processor, the program including instructions to:
   determine a radio network information measurement configuration of a network node according to an access request message, wherein the radio network information measurement configuration comprises an execution entity of measurement;
   receive radio network information sent by the network node, wherein the radio network information comprises radio channel information and service serving information;
   determine, according to the radio network information, a radio network function that needs to be triggered and an algorithm corresponding to the radio network function, and encapsulate radio network information required by the algorithm into a radio network information combination for the algorithm;
   determine an execution policy of the algorithm according to the radio network information combination obtained by encapsulation; and
   generate execution control signaling according to the execution policy, and send the execution control signaling to the network node, so that the network node completes the radio network function.

2. The radio network controller according to claim 1, wherein the program further includes instructions to receive access request information sent by the network node.

3. The radio network controller according to claim 2, wherein the radio network information measurement configuration comprises the execution entity of measurement, a measurement object, and a report cycle.

4. The radio network controller according to claim 3, wherein the instructions to receive radio network information sent by the network node comprise instructions to:
   generate measurement signaling procedure invoking information according to the radio network information measurement configuration;
   invoke preset measurement control signaling according to the measurement signaling procedure invoking information; and
   send the measurement control signaling to the network node, and receive the radio network information sent by the network node.

5. The radio network controller according to claim 1, wherein the instructions to determine the-radio network function that needs to be triggered and an algorithm corresponding to the radio network function, and encapsulate the radio network information comprises instructions to:
   store the radio network information;
   determine, according to a preset radio network function trigger list, when at least one piece of radio network information in the radio network information meets a preset trigger condition, the radio network function that needs to be triggered and the algorithm corresponding to the radio network function; and
   encapsulate, according to a preset radio network information list, the radio network information that is required by the algorithm into the radio network information combination for the algorithm.

6. The radio network controller according to claim 1, wherein the instructions to determine an execution policy of the algorithm comprise instructions to:
   select a corresponding algorithm according to the radio network information combination obtained by encapsulation, and generate an operation result of the algorithm, wherein the operation result comprises an execution procedure and a configuration parameter that are of the network node; and
   determine the execution policy of the algorithm according to the operation result of the algorithm.

7. The radio network controller according to claim 1, wherein the instructions to generate the execution control signaling, and send the execution control signaling to the network node comprise instructions to:
   generate execution control signaling procedure invoking information according to the execution policy;
   invoke preset execution control signaling according to the execution control signaling procedure invoking information; and
   send, to the network node, the execution control signaling.

8. The radio network controller according to claim 1, wherein the program further includes instructions to:
   configure, when a new radio network function needs to be configured, a radio network information combination required by an algorithm corresponding to each radio network function, configure a trigger condition of each radio network function, configure an execution policy of each algorithm, and configure execution control signaling corresponding to each execution policy.

9. A radio network control method comprising:
   determining a radio network information measurement configuration of a network node according to an access request message, wherein the radio network information measurement configuration comprises an execution entity of measurement;
   receiving radio network information sent by the network node, wherein the radio network information comprises radio channel information and service serving information;
   determining, according to the radio network information, a radio network function that needs to be triggered and an algorithm corresponding to the radio network function;
   encapsulating radio network information required by the algorithm into a radio network information combination for the algorithm;
   determining an execution policy of the algorithm according to the radio network information combination for the algorithm;
   generating execution control signaling according to the execution policy; and
   sending the execution control signaling to the network node, so that the network node completes the radio network function.

10. The method according to claim 9, wherein the method further comprises:
   receiving access request information sent by the network node before the receiving the radio network information sent by the network node.

11. The method according to claim 10, wherein the radio network information measurement configuration comprises the execution entity of measurement, a measurement object, and a report cycle.

12. The method according to claim 11, wherein the method further comprises performing, after receiving the access request information:

generating measurement signaling procedure invoking information according to the radio network information measurement configuration;

invoking preset measurement control signaling according to the measurement signaling procedure invoking information; and sending the measurement control signaling to the network node.

13. The method according to claim 9, wherein before determining the radio network function, the method further comprises:

storing the radio network information;

wherein determining the radio network function comprises:

when at least one piece of radio network information of the stored radio network information meets a trigger condition, determining, according to a preset radio network function trigger list, the radio network function that needs to be triggered and the algorithm corresponding to the radio network function; and wherein encapsulating the radio network information comprises:

encapsulating, according to a preset radio network information list, the radio network information required by the algorithm that needs to be triggered into the radio network information combination for the algorithm.

14. The method according to claim 9, wherein determining the execution policy of the algorithm comprises:

selecting a corresponding algorithm according to the radio network information combination, and generating an operation result of the algorithm, wherein the operation result comprises an execution procedure and a configuration parameter that are of the network node; and determining the execution policy of the algorithm according to the operation result of the algorithm.

15. The method according to claim 9, wherein generating the execution control signaling comprises:

generating execution control signaling procedure invoking information according to the execution policy; and invoking preset execution control signaling according to the execution control signaling procedure invoking information.

16. The method according to claim 9, wherein the method further comprises:

when a new radio network function needs to be configured, configuring a radio network information combination required by an algorithm corresponding to each radio network function, configuring a trigger condition of each radio network function, configuring an execution policy of each algorithm, and configuring execution control signaling corresponding to each execution policy.

17. A radio network controller comprising:

a processor; and a memory storing a plurality of computer executable instructions stored thereon, when executed by the processor, causes the processor to:

receive radio network information sent by a network node, including instructions to invoke preset measurement control signaling according to measurement signaling procedure invoking information, and send the measurement control signaling to the network node, wherein the radio network information comprises radio channel information and service serving information;

determine, according to the radio network information, a radio network function that needs to be triggered and an algorithm corresponding to the radio network function;

encapsulate radio network information required by the algorithm into a radio network information combination for the algorithm;

determine an execution policy of the algorithm according to the radio network information combination for the algorithm;

generate execution control signaling according to the execution policy; and send the execution control signaling to the network node, so that the network node completes the radio network function.

18. The radio network controller according to claim 17, wherein the memory stores further computer readable instructions, when executed by the processor, further cause the processor to:

receive access request information sent by the network node.

19. The radio network controller according to claim 17, wherein the memory stores further computer readable instructions, when executed by the processor, further cause the processor to:

determine a radio network information measurement configuration of the network node according to an access request message, wherein the radio network information measurement configuration comprises an execution entity of measurement, a measurement object, and a report cycle.

20. The radio network controller according to claim 19, wherein the memory stores further computer readable instructions, when executed by the processor, further cause the processor to:

generate the measurement signaling procedure invoking information according to the radio network information measurement configuration.

* * * * *